United States Patent [19]

Hsieh

[11] 4,127,710

[45] Nov. 28, 1978

[54] COPOLYMERIZATION OF A 1,3-CYCLODIENE AND A LINEAR CONJUGATED DIENE

[75] Inventor: Henry L. Hsieh, Bartlesville, Okla.

[73] Assignee: Phillips Petroleum Company, Bartlesville, Okla.

[21] Appl. No.: 511,561

[22] Filed: Oct. 2, 1974

[51] Int. Cl.$^2$ .......................... C08F 4/70; C08F 32/06
[52] U.S. Cl. .................................... 526/133; 526/122; 526/137; 526/138; 526/153; 526/157; 526/169.1; 526/308; 526/907
[58] Field of Search ............... 260/82.1; 526/122, 133, 526/137, 138, 153, 157, 169.1

[56] References Cited

U.S. PATENT DOCUMENTS

| | | | |
|---|---|---|---|
| 3,170,905 | 2/1965 | Ueda et al. | 260/94.3 |
| 3,170,906 | 2/1965 | Ueda et al. | 260/94.3 |
| 3,170,907 | 2/1965 | Ueda et al. | 260/94.3 |
| 3,525,729 | 8/1970 | Gaeth | 260/94.3 |
| 3,649,607 | 3/1972 | Furukawa et al. | 260/82.1 |
| 3,674,759 | 7/1972 | Yamawaki et al. | 260/94.3 |
| 3,740,382 | 6/1973 | Dolgoplosk et al. | 260/82.1 |

*Primary Examiner*—Edward J. Smith

[57] ABSTRACT

A 1,3-cyclodiene comonomer and a linear conjugated diene comonomer are copolymerized employing a catalyst formed from a mixture comprising a triorganoaluminum compound, a nickel (II) compound and a Friedel-Crafts type cocatalyst. Also, a catalyst and a method for the production thereof which is useful in the copolymerization is provided.

10 Claims, No Drawings

COPOLYMERIZATION OF A 1,3-CYCLODIENE AND A LINEAR CONJUGATED DIENE

BACKGROUND

The invention relates to a method for copolymerizing conjugated dienes. In one aspect the invention relates to a catalyst useful in the copolymerization. In another aspect the invention relates to a method for the production of the catalyst.

Copolymers of 1,3-cyclodienes and linear conjugated dienes are known in the art. They represent a variety of useful copolymers such as the rubbery cis-copolymers of 1,3-butadiene and 1,3-cyclohexadiene. A number of these copolymers are suitable for applications such as shoe soles, automobile tires and bumpers, and other hard rubber applications.

Although several methods and catalysts which are useful to produce the above copolymers are known, new methods and catalysts are desirable in order to fully develop this area of technology.

Therefore, it is an object of the invention to produce copolymers of 1,3-cyclodienes and linear conjugated dienes.

Another object of the invention is to provide a catalyst which is useful to produce copolymers of 1,3-cyclodienes and linear conjugated dienes.

Other objects, aspects and advantages of the invention will be apparent to those skilled in the art upon studying the specification and the appended claims.

SUMMARY

According to the invention, a 1,3-cyclodiene and a linear conjugated diene are copolymerized employing a catalyst formed from a mixture comprising a triorganoaluminum compound, a nickel (II) compound, and a Friedel-Crafts type cocatalyst.

Further according to the invention a catalyst formed from a mixture comprising a triorganoaluminum compound, a nickel (II) compound and a Friedel-Crafts type cocatalyst is provided.

DETAILED DESCRIPTION OF THE INVENTION

The comonomers suitable for use in the present invention are referred to generally as 1,3-cyclodienes and linear conjugated dienes. 1,3-cyclodienes suitable for use in the invention are represented by the general formula

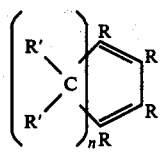

In the formula, $n$ can be 1 or 2 and R can be hydrogen, methyl or ethyl. The R groups can be the same or different. R' can be hydrogen, an alkyl group either linear or branched, or cycloalkyl or aryl such that the maximum number of carbon atoms per R' group is about 6. The R' groups can be the same or different. The total number of carbon atoms in the 1,3-cyclodiene molecule can be in the range from 5 to about 20. Examples of such compounds include 1,3-cyclopentadiene, 2-methyl-1,3-cyclopentadiene, 5-ethyl-1,3-cyclopentadiene, 1,3-cyclohexadiene, 1-ethyl-1,3-cyclohexadiene, 1,4-dimethyl-5-isopropyl-1,3-cyclohexadiene, 2,3-dimethyl-5,6-diphenyl-1,3-cyclohexadiene, 2,3-diethyl-5-(n-butyl)-6-phenyl-1,3-cyclohexadiene and 1-methyl-5-cyclohexyl-1,3-cyclohexadiene.

The linear conjugated diene suitable for use in the invention generally contains from about 4 to 12 carbon atoms; however, molecules containing from about 4 to 8 carbon atoms are preferred since they are more readily available and are generally more reactive.

Examples of linear conjugated dienes include 1,3-butadiene isoprene, piperylene, 2-methyl-1,3-pentadiene, 2,3-dimethyl-1,3-butadiene, 1,3-octadiene and 5,6-diethyl-1,3-octadiene.

It is within the scope of this invention to employ mixtures of 1,3-cyclodienes and/or mixtures of linear conjugated dienes.

The invention is operable within a wide range of comonomer ratios. Generally the linear conjugated diene to 1,3-cyclodiene ratio varies in the range of from about 99:1 to 1:99, but a range of from about 95:5 to 40:60 is preferred for producing polymers which are more rubbery in character.

The catalyst system of this invention can be described as the combination of active nickel in a reduced form and a Lewis acid of the type customarily exemplified by the Friedel-Crafts catalysts. Nickel in the reduced form is obtained by the reaction of a triorganoaluminum compound and a nickel (II) compound.

Suitable triorganoaluminum compounds can be represented by the generic formula $$R_3''Al$$

wherein R'' is a hydrogen radical selected from the group consisting of alkyl, cycloalkyl, aryl and combinations thereof including alkaryl, aralkyl and the like containing from 1 to 20 carbon atoms. Exemplary triorganoaluminum compounds include trimethylaluminum, triethylaluminum, tri-n-butylaluminum, triisobutylaluminum, tri-n-hexylaluminum, tri-n-dodecylaluminum, tri-n-eicosylaluminum, tricyclohexylaluminum, triphenylaluminum, methyldiphenylaluminum, ethyldi(3,5-di-n-heptylphenyl)aluminum, tribenzylaluminum, tris(1-naphthyl)aluminum, di-n-octylphenylaluminum and tri-4-tolylaluminum.

Nickel (II) compounds suitable for use in the invention vary widely. It is preferred to use nickel (II) compounds which are soluble in hydrocarbons because a hydrocarbon diluent is generally used to dissolve the triorganoaluminum compound. Thus, more intimate contacting of the nickel (II) compound and the triorganoaluminum reducing agent is obtained which in turn facilitates reduction of the nickel (II) ions. Examples of suitable nickel (II) compounds include nickel salts of organic carboxylic acids, preferably the more readily available compounds containing 2 to about 20 carbon atoms, e.g. nickel octoate, nickel stearate, nickel oleate, nickel naphthenate, and also other nickel (II) compounds such as nickel acetylacetonate, nickel benzoylacetonate and dicyclopentadienyl nickel.

The cocatalyst used in the present invention is a Lewis acid of the type customarily identified as a Friedel-Crafts type catalyst. Compounds suitable to employ as the Friedel-Crafts type cocatalysts vary widely and include, for example, boron trifluoride, boron trifluoride etherate, aluminum chloride, stannic chloride, aluminum bromide, aluminum sesquichloride, sulfuric acid and hydrogen fluoride.

It is within the scope of the invention to employ mixtures of the said triorganoaluminums, mixtures of said nickel (II) compounds or mixtures of said Lewis acids. It is also within the scope of the invention to carry out the reduction of the nickel (II) compound in the polymerization reactor wherein it is to be employed, or alternatively the reduced nickel can be supplied to the polymerization reactor in a reduced state with the reduction having been carried out in another reactor.

The mole ratios of the different catalyst components can vary widely. Generally, the quantity of the triorganoaluminum compound employed ranges from about 0.5 to 30 moles per mole of the nickel (II) compound, and the amount of the cocatalyst employed ranges from about 0.5 to 30 moles per mole of the nickel (II) compound. Good results have been obtained, however, employing a more narrow range of catalyst components wherein the amount of the triorganoaluminum compound ranges from about 0.8 to 20 moles per mole of the nickel (II) compound, and the amount of the cocatalyst ranges from about 1 to 20 moles per mole of the nickel (II) compound.

The total amount of catalyst employed according to the invention varies widely. Generally, the amount of catalyst ranges from about 0.05–50 millimoles of the nickel (II) compound per hundred grams of total comonomer, although good results are obtained employing a range from about 0.5 to 10 millimoles of the nickel (II) compound per hundred grams of total comonomer.

The components of the polymerization mixture can be charged in what is considered the normal or customary order, that is, diluent, comonomers, and catalyst. However, one aspect of the invention resides essentially in employing a different or abnormal but preferable charge order. Thus, according to one embodiment of the invention a higher molecular weight copolymer is produced by aging a mixture comprising the triorganoaluminum compound and the nickel (II) compound. As earlier indicated both the above compounds are preferably soluble in a hydrocarbon diluent and accordingly the aging process is generally accomplished in a suitable hydrocarbon diluent. By aging as used herein, is meant maintaining a mixture for a specified period of time and within a certain temperature range. In forming the reduced nickel by the reaction of a triorganoaluminum on a nickel (II) compound, it is not critical whether the nickel compound is charged prior to the aluminum compound or vice versa. It also is not critical whether the 1,3-cyclodiene is charged prior to during, or after, the formation of the reduced nickel. It is essential, however, to contact the reduced nickel with the 1,3-cyclodiene prior to introducing the linear, conjugated diene. In the preferred charge order, the solvent is charged first, the 1,3-cyclodiene and reduced nickel (in either order) are charged second, the linear, conjugated diene is charged third, and the cocatalyst is charged last.

Good results can be obtained where the triorganoaluminum compound and the nickel (II) compound are mixed together and maintained at a temperature in the range of from about 0° to 100° C. for from about 2 minutes to as long as 5 hours. However, better results are obtained in terms of a higher molecular weight copolymer, wherein the aging ranged from about 10 minutes to 2 hours at a temperature of from about 25° to 70° C.

The polymerization process of this invention is usually carried out in the presence of a diluent as previously indicated. Diluents suitable for use in the process are hydrocarbons which are not detrimental to the polymerization process. Suitable diluents include paraffinic, cycloparaffinic and aromatic hydrocarbons and mixtures thereof, for example n-heptane, 2,2,4-trimethylpentane, cyclohexane, benzene, toluene and xylenes.

The polymerization reaction can be carried out under autogenous pressure or at any suitable pressure sufficient to maintain the reaction mixture substantially in the liquid phase. The pressure will thus depend upon the particular being employed and the temperature at which the polymerization is carried out. However, higher pressures can be employed if desired, these pressures being obtained by some such suitable method as the pressurization of the reactor with a gas which is inert with respect to the polymerization reaction.

The temperature at which the copolymerization is carried out varies widely and is generally in the range of from about 0° to 100° C., although good results were obtained employing a copolymerization temperature in the range of from about 20° to 70° C.

The time required for the polymerization, exclusive of the time required in catalyst formation and reactor charging, will be dependent upon such factors as the molecular weight desired, quantity of catalyst employed, temperature, and the like, but generally will range from a few minutes to such as 48 hours although longer polymerization periods can be employed.

The process can be carried out batchwise or as a continuous process.

Various materials are known to be detrimental to the catalyst employed in preparing the polymers of this invention. These materials include carbon dioxide, oxygen and water. It is usually desirable, therefore, that the reactants and catalysts be freed of these materials as well as other materials which may tend to inactivate the catalyst. Furthermore, it is desirable to remove air and moisture from the reaction vessel in which the polymerization is to be conducted. Upon completion of the polymerization, the polymerization mixture is then treated to inactivate the catalyst and to recover the polymer. A suitable method for accomplishing this result involves steam stripping the diluent from the polymer. In another suitable method, a catalyst-inactivating material such as an alcohol, is added to the mixture so as to inactivate the catalyst and cause precipitation of the polymer. The polymer is then separated from the alcohol and diluent by any suitable means, such as decantation or filtration. It has been found to be advantageous to add an antioxidant, such as 2,6-di-t-butyl-4-methylphenol to the polymer. This can be accomplished conveniently by adding the antioxidant to the polymer solution prior to recovery of the polymer.

ILLUSTRATIVE EXAMPLES

The polymerizations were carried out under nitrogen in capped beverage bottles employing anhydrous reactants and conditions. The charge order is the order of listing recipe components in each recipe, except as otherwise indicated. The bottles were tumbled in a constant temperature bath for the stipulated polymerization times and at the stipulated temperatures. Following polymerization, 2,6-di-t-butyl-4-methylphenol (1 part by weight per hundred parts of monomer) was added in a 50/50 volume toluene/isopropyl alcohol solution, the polymer solutions were filtered, and the polymers were coagulated by adding the filtrates to isopropyl alcohol. The polymers were then collected by filtration and dried at reduced pressure. Polymers thus produced are rubbery in character. As used herein, butadiene and cyclohexadiene refer to 1,3-butadiene and 1,3-cyclohexadiene, respectively.

EXAMPLES 1-8

A series of runs were made in accordance with the following recipe wherein butadiene and also butadiene-cyclohexadiene mixtures were polymerized over the inventive catalyst. The results are tabulated below:

| RECIPE | phm | mhm |
|---|---|---|
| Cyclohexane | 780 | |
| Nickel naphthenate | | variable |
| Triisobutylaluminum | | 2.0 |
| Butadiene | 70 | |
| 1,3-Cyclohexadiene | 30 | |
| Boron trifluoride | | variable |
| Polymerization temperature, °C | | variable |
| Polymerization time, hrs. | | 16 |

| Example | Nickel Naphthenate mhm | $BF_3$—$Et_2O$ mhm | Polymerization Temperature °C | Conversion to Polymer wt. % | Inherent Viscosity | Gel wt. % | Trans wt. % | Vinyl wt. % |
|---|---|---|---|---|---|---|---|---|
| 9 | 0.8 | 6.0 | 50 | 95 | 0.77 | 0 | — | — |
| 10 | 1.0 | 6.0 | 50 | 88 | 0.74 | 0 | — | — |
| 11 | 1.2 | 6.0 | 50 | 98 | 0.75 | 0 | 1.5 | 1.6 |
| 12 | 0.8 | 6.0 | 30 | 95 | 0.78 | 0 | — | — |
| 13 | 1.0 | 6.0 | 30 | 90 | 1.00 | 0 | — | — |
| 14 | 1.2 | 6.0 | 30 | 90 | 1.02 | 0 | 1.3 | 1.6 |
| 15 | 0.8 | 10.0 | 50 | 95 | 0.63 | 0 | — | — |
| 16 | 1.0 | 10.0 | 50 | 84 | 0.63 | 0 | — | — |
| 17 | 1.2 | 10.0 | 50 | 90 | 0.64 | 0 | — | — |
| 18 | 0.8 | 10.0 | 50 | 91 | 0.85 | 0 | — | — |
| 19 | 1.0 | 10.0 | 30 | 92 | 0.92 | 0 | — | — |
| 20 | 1.2 | 10.0 | 30 | 90 | 0.89 | 0 | 1.0 | 1.7 |

| RECIPE | phm[(1)] | mhm[(2)] |
|---|---|---|
| Cyclohexane | 780 | |
| Nickel Naphthenate | | 1.0 |
| Triisobutylaluminum | | variable |
| 1,3-Cyclohexadiene | variable | |
| Butadiene | variable | |
| Boron trifluoride etherate | | variable |
| Polymerization temperature, °C | | 50 |
| Polymerization time, hrs. | | 16 |

| Ex. | Monomer pbm[1] Butadiene | Monomer pbm[1] Cyclo-hexadiene | iso-$Bu_3Al$ mhm[2] | $BF_3$—$Et_2O$ mhm | Conversion to Polymer wt. % | Inherent Viscosity[3] | Gel[4] wt. % | Trans[5] wt. % | Vinyl[5] wt. % |
|---|---|---|---|---|---|---|---|---|---|
| 1 | 100 | 0 | 2 | 4 | 92 | 2.31 | 0 | 1.8 | 1.4 |
| 2 | 100 | 0 | 4 | 4 | 62 | 4.72 | 46 | —[6] | — |
| 3 | 100 | 0 | 2 | 8 | 100 | 1.46 | 0 | — | — |
| 4 | 100 | 0 | 4 | 8 | 98 | 2.26 | 0 | — | — |
| 5 | 50 | 50 | 2 | 4 | 60 | 0.74 | 0 | 0.7 | 1.7 |
| 6 | 50 | 50 | 4 | 4 | 10 | — | — | — | — |
| 7 | 50 | 50 | 2 | 8 | 83 | 0.55 | 0 | 0.8 | 1.7 |
| 8 | 50 | 50 | 4 | 8 | 50 | 0.66 | 0 | 1.3 | 1.2 |

[1] Parts by weight per hundred by weight of monomer.
[2] Gram millimoles per hundred grams monomer.
[3] Inherent viscosity determined in accordance with U.S. 3,278,508, column 20, note a with the modification that tetrahydrofuran was employed in place of toluene and with the further modification that the solution was not filtered through a sulfur absorption tube but rather a sample of the solution was filtered through a fritted glass filter stick of grade C porosity and pressured directly into the viscometer.
[4] The gel content of the polymer was determined in weight percent in accordance with U.S. 3,278,508, column 20, note b with the modification that tetrahydrofuran was employed in place of toluene.
[5] Microstructure as determined by infrared absorption spectroscopy.
[6] A dash denotes a determination was not made.

From the above it is concluded that both butadiene homopolymerization and butadiene/cyclohexadiene copolymerization (conversions to polymer in Runs 5 and 7 indicate both monomers participate) occurs over the catalyst of the invention. Also the copolymers possess high cis structure.

EXAMPLES 9-20

A series of runs was made varying polymerization temperature and initiator composition. These runs were made in accordance with the following recipe. The results are tabulated below.

From the above, it is concluded that the system is not highly sensitive to the variations here exemplified and the lower temperatures of examples 12-14 and 19-20 appear to favor production of polymers of higher inherent viscosity. In addition, the high conversions are clearly indicative of participation by both monomers; and, in view of the trans and vinyl values, the polymers have notably high cis contents.

EXAMPLES 21-26

The following runs were made under the recipe of Examples 9-20 except that a low and constant temperature of 11° C. was employed. The results are tabulated below.

| Run No. | Nickel Naphthenate mhm | $BF_3$—$OEt_2$ mhm | Conversion to Polymer wt. % | Inherent Viscosity | Gel wt. % | Trans wt. % | Vinyl wt. % |
|---|---|---|---|---|---|---|---|
| 21 | 0.8 | 6.0 | 84 | 1.27 | 0 | — | — |
| 22 | 1.0 | 6.0 | 84 | 1.29 | 0 | — | — |
| 23 | 1.2 | 6.0 | 80 | 1.39 | 0 | 0.9 | 1.6 |
| 24 | 0.8 | 10.0 | 90 | 0.94 | 0 | — | — |

-continued

| Run No. | Nickel Naph- thenate mhm | BF$_3$— OEt$_2$ mhm | Con- version to Poly- mer wt. % | In- her- ent Vis- cosity | Gel wt. % | Trans wt. % | Vinyl wt. % |
|---|---|---|---|---|---|---|---|
| 25 | 1.0 | 10.0 | 90 | 1.12 | 0 | — | — |
| 26 | 1.2 | 10.0 | 90 | 1.17 | 0 | 0.8 | 1.7 |

In comparison to the previous examples, the relatively lower temperature affords relatively higher inherent viscosities and lower conversions.

EXAMPLES 27-31

A series of runs was made in accordance with the following recipe wherein conversion/polymerization time relationships were followed. The results are tabulated below.

| RECIPE | phm | mhm |
|---|---|---|
| Cyclohexane | 780 | |
| Nickel naphthenate | | 0.8 |
| Triisobutylaluminum | | 1.6 |
| Butadiene | 70 | |
| 1,3-Cyclohexadiene | 30 | |
| Boron trifluoride etherate | | 10 |
| Polymerization temperature, °C | | 30 |
| Polymerization time | | variable (to termination) |

| Example | Polymerization Time, hrs. | Conversion to Polymer wt. % | Cyclohexadiene[1] |
|---|---|---|---|
| 27 | 1 | 26 | 19 |
| 28 | 2.25 | 54 | 11 |
| 29 | 3.25 | 64 | 17 |
| 30 | 4.25 | 73 | 17 |
| 31 | 5.25 | 70 | — |

[1]Mole percent cyclohexadiene in polymer as determined by nuclear magnetic resonance spectroscopy (NMR).

The quite consistent cyclohexadiene values indicate that, as polymerization proceeds, the average polymer composition remains correspondingly constant. This precludes the existence of substantial block structure and indicates the polymers are at least basically random.

EXAMPLES 32-37

A series of runs was made, in accordance with the following recipe, to determine the effect of variations in charge order. The results are tabulated below, indicating the various respective charge orders employed, with the runs being listed in order of declining inherent viscosity.

| RECIPE | phm | mhm |
|---|---|---|
| Cyclohexane (Cy) | 780 | |
| Nickel naphthenate (Ni) | | 0.6 |
| Triisobutylaluminum (Al) | | 1.4 |
| Butadiene (Bd) | 80 | |
| 1,3-Cyclohexadiene (CHD) | 20 | |
| Boron trifluoride etherate (BE) | | 3.0 |
| Polymerization temperature, °C | | 30 |
| Polymerization time, hours | | 16 |

| Example | Charge Order | | | | | | | Conversion to Polymer wt. % | Inherent Viscosity | Status[a] |
|---|---|---|---|---|---|---|---|---|---|---|
| | 1 | 2 | 3 | 4 | 5 | 6 | 7 | | | |
| 32 | Cy | Ni | Al | CHD | 50° C/1 hr[b] | Bd | BE | 65 | 2.26 | P |
| 33 | Cy | CHD | Al | Ni | 50° C/1 hr | Bd | BE | 83 | 1.67 | P |
| 34 | Cy | CHD | Ni | Al | 50° C/1 hr | Bd | BE | 85 | 1.63 | P |
| 35 | Cy | Ni | Al | Bd | 50° C/1 hr | CHD | BE | 85 | 1.21 | LP |
| 36 | Cy | Bd | CHD | Ni | Al | | BE | 81 | 1.20 | LP |
| 37 | Cy | Bd | Ni | Al | 50° C/1 hr | CHD | BE | 78 | 1.10 | LP |

[a]P denotes preferred, LP denotes less preferred.
[b]The polymerization mixture, at this point in the charge order, was maintained at 50° C for 1.0 hr, then cooled to room temperature prior to continuing with the indicated charge order.

It is apparent from the above data that higher inherent viscosity values accrue from runs wherein cyclohexadiene is contacted with reduced nickel prior to the introduction of butadiene. Higher viscosity values are, of course, indicative of higher degrees of polymerization.

EXAMPLES 38-43

Another series of runs, similar to those of Examples 32-37, was made in accordance with the following recipe. The results are tabulated below with the runs being listed in order of declining inherent viscosity. This tabulation reflects the various charge orders that were employed.

| RECIPE | phm | mhm |
|---|---|---|
| Cyclohexane (Cy) | 390 | |
| Nickel naphthenate (Ni) | | 0.6 |
| Triisobutylaluminum (Al) | | 1.4 |
| Butadiene (Bd) | 80 | |
| 1,3-Cyclohexadiene (CHD) | 20 | |
| Boron trifluoride etherate (BE) | | 3.0 |
| Polymerization temperature, °C | | 30 |
| Polymerization time, hours | | 16 |

| Example | 1 | 2 | 3 | 4 | 5 | 6 | 7 | Conversion to Polymer wt. % | Inherent Viscosity | Status | Cyclohexadiene Content of Polymer[a] mole % | wt. % |
|---|---|---|---|---|---|---|---|---|---|---|---|---|
| 38 | Cy | Ni | Al | CHD | 50° C/1 hr | Bd | BE | 74 | 2.93 | P | 12 | 17 |
| 39 | Cy | CHD | Al | Ni | 50° C/1 hr | Bd | BE | 81 | 2.21 | P | 19 | 26 |
| 40 | Cy | CHD | Ni | Al | 50° C/1 hr | Bd | BE | 80 | 1.94 | P | — | — |
| 41 | Cy | Bd | CHD | Ni | Al | | BE | 92 | 1.01 | LP | 24 | 32 |
| 42 | Cy | Ni | Al | Bd | 50° C/1 hr | CHD | BE | 95 | 0.99 | LP | — | — |
| 43 | CY | Bd | Ni | Al | 50° C/1 hr | CHD | BE | 94 | 0.99 | LP | — | — |

[a]Determined by nuclear magnetic resonance spectroscopy

As in Examples 32-37, higher inherent viscosity values were obtained by contacting cyclohexadiene with reduced nickel prior to the introduction of butadiene. It would appear from both Examples 32-37 and the above Examples that the preferred sequences for the addition of Ni, Al and CHD are, in order of preference: (a) Ni, Al, CHD, (b) CHD, Al, Ni, and (c) CHD, Ni, Al based on the relative inherent viscosities of the resulting polymers.

EXAMPLES 44-49

Further runs were made with additional variations in the manner of charging reactants and with variation in the amount of the Lewis acid cocatalyst. The runs were made in accordance with the following recipe and the results are tabulated below.

| RECIPE | phm | mhm |
|---|---|---|
| Cyclohexane (Cy) | 390 | |
| Nickel naphthenate | | 0.5 |
| Triisobutylaluminum (Al) | | 1.0 |
| Butadiene (Bd) | 80 | |
| 1,3-Cyclohexadiene (CHD) | 20 | |
| Boron trifluoride etherate (BE) | | variable |
| Polymerization temperature, °C | | 30 |
| Polymerization time, hours | | 16 |

| Example | BF$_3$ · etherate mhm | 1 | 2 | 3 | 4 | 5 | 6 | 7 | Conversion to Polymer wt. % | Inherent Viscosity | Status |
|---|---|---|---|---|---|---|---|---|---|---|---|
| 44 | 2.0 | Cy | Ni | Al | CHD | 50° C/0.5 hr | Bd | BE | 75.2 | 2.45 | P |
| 45 | 2.6 | Cy | Ni | Al | CHD | 50° C/0.5 hr | Bd | BE | 79.3 | 2.27 | P |
| 46 | 2.0 | Cy | Ni | Al | CHD | 25° C/0.5 hr | Bd | BE | 80.0 | 1.99 | P |
| 47 | 2.6 | Cy | Ni | Al | CHD | 25° C/0.5 hr | Bd | BE | 83.5 | 1.84 | P |
| 48 | 2.0 | Cy | Bd | CHD | Ni | Al | BE | | 79.8 | 1.66 | LP |
| 49 | 2.6 | Cy | Bd | CHD | Ni | Al | BE | | 84.5 | 1.50 | P |

As in the previous two sets of examples, higher inherent viscosity values were obtained by contacting cyclohexadiene with reduced nickel prior to the introduction of butadiene. In addition, by comparing Example 44 with 46 and Example 45 with 47 one can see that higher inherent viscosities were obtained by allowing the cyclohexadiene-reduced nickel system to stand at 50° C for 0.5 hr. as opposed to 25° C for 0.5 hr.

What is claimed is:

1. A method comprising:
   copolymerizing a 1,3-cyclodiene comonomer and a linear conjugated diene comonomer in the presence of a catalyst formed from a mixture comprising
   (a) a triorganoaluminum compound represented by the general formula R$_3$"Al wherein R" is a hydrocarbon radical containing from 1 to 20 carbon atoms selected from the group consisting of alkyl, cycloalkyl, aryl, alkaryl, aralkyl, and mixtures thereof;
   (b) a nickel (II) compound; and
   (c) a Friedel-Crafts type Lewis acid cocatalyst wherein the amount of the triorganoaluminum compound is in the range of from about 0.5 to 30 moles per mole of the nickel (II) compound, the amount of the Friedel-Crafts type cocatalyst is in the range of from about 0.5 to 30 moles per mole of the nickel (II) compound, and the amount of nickel (II) compound is in the range of from about 0.05 to 50 millimoles per hundred grams of total comonomer.

2. The method of claim 1 wherein the triorganoaluminum compound is selected from the group consisting of trimethylaluminum, triethylaluminum, tri-n-butylaluminum, triisobutylaluminum, tri-n-hexylaluminum, tri-n-dodecylaluminum, tri-n-eicosylaluminum, tricyclohexylaluminum, triphenylaluminum, methyldiphenylaluminum, ethyldi(3,5-di-n-heptylphenyl)aluminum, tribenzylaluminum, tris(1-naphthyl)aluminum, di-n-octylphenylaluminum and tris-4-tolylaluminum;
   wherein the nickel (II) compound is selected from the group consisting of nickel octoate, nickel stearate, nickel oleate, nickel naphthenate, nickel acetylacetonate, nickel benzoylacetonate, and dicyclopentadienyl nickel;
   wherein the Friedel-Crafts type cocatalyst is selected from the group consisting of boron trifluoride, boron trifluoride etherate, aluminum chloride, stannic chloride, aluminum bromide, aluminum sesquichloride, sulfuric acid and hydrogen fluoride;
   wherein the amount of the triorganoaluminum compound is in the range of from about 0.8 to 20 moles per mole of the nickel (II) compound, the amount of the Friedel-Crafts type cocatalyst is in the range of from about 1 to 20 moles per mole of the nickel (II) compound, and the total amount of catalyst present during the copolymerization based on the amount of nickel (II) compound is in the range of from about 0.5 to 10 millimoles per hundred grams of total comonomer.

3. The method of claim 1 wherein the copolymerization is carried out in the presence of a hydrocarbon diluent which is not detrimental to the copolymerization process.

4. The method of claim 1 wherein the linear conjugated diene comonomer and the Friedel-Crafts type cocatalyst are added to a mixture comprising the nickel (II) compound, the triorganoaluminum compound and the 1,3-cyclodiene comonomer.

5. The method of claim 1 wherein the 1,3-cyclodiene comonomer is represented by the general formula

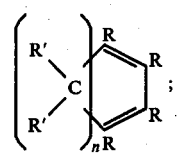

wherein R is a hydrogen, methyl or ethyl, R' is a hydrogen, linear or branched alkyl, cycloalkyl, or aryl such that the maximum number of carbon atoms per R' group is about 6, n is 1 or 2, and the total number of carbon atoms in the comonomer ranges from about 5 to 20;
   wherein the total number of carbon atoms in the linear conjugated diene comonomer ranges from about 4 to 12; and
   wherein the linear conjugated diene to 1,3-cyclodiene weight ratio ranges from about 1:99 to 99:1.

6. The method of claim 5 wherein the number of carbon atoms in the linear conjugated diene comonomer ranges from about 4 to 8 and the linear conjugated diene to 1,3-cyclodiene comonomer ranges from about 95:5 to 40:60.

7. The method of claim 6 wherein the 1,3-cyclodiene comonomer is 1,3-cyclohexadiene, the linear conjugated diene comonomer is 1,3-butadiene, the triorganoaluminum compound is triisobutylaluminum, the nickel (II) compound is nickel naphthenate, and the Friedel-Crafts type cocatalyst is boron trifluoride etherate.

8. The method of claim 7 wherein the copolymer produced is basically a random copolymer.

9. A method comprising: copolymerizing a 1,3-cyclodiene comonomer and a linear conjugated diene comonomer in the presence of a catalyst formed from a mixture comprising
 (a) a triorganoaluminum compound represented by the general formula $R_3''Al$ wherein $R''$ is a hydrocarbon radical containing from 1 to 20 carbon atoms selected from the group consisting of alkyl, cycloalkyl, aryl, alkaryl, aralkyl, and mixtures thereof;
 (b) a nickel (II) compound; and
 (c) a Friedel-Crafts type Lewis acid cocatalyst wherein the amount of the triorganoaluminum compound is in the range of from about 0.5 to 30 moles per mole of the nickel (II) compound, the amount of the Friedel-Crafts type cocatalyst is in the range of from about 0.5 to 30 moles per mole of the nickel (II) compound, and the amount of nickel (II) compound is in the range of from about 0.05 to 50 millimoles per hundred grams of total comonomer,
wherein the linear conjugated diene comonomer and the Friedel-Crafts type cocatalysts are added to a mixture comprising the nickel (II) compound and the triorganoaluminum compound wherein the mixture is aged from about 2 minutes to 5 hours, at a temperature in the range of from about 0° to 100° C. prior to adding the linear conjugated diene comonomer and the Friedel-Crafts type cocatalyst to said mixture, and said 1,3-cyclodiene is added prior to, during or after formation of the reduced nickel (II) compound by aging the mixture, but the reduced nickel II compound is contacted with the 1,3-cyclodiene prior to contacting the conjugated diene comonomer.

10. The method of claim 9 wherein said mixture is aged from about 10 minutes to 2 hours at a temperature in the range of from about 25° to 70° C. prior to adding the linear conjugated diene comonomer and the Friedel-Crafts type cocatalyst to said mixture.

* * * * *